US010432584B1

(12) United States Patent
Raman et al.

(10) Patent No.: US 10,432,584 B1
(45) Date of Patent: Oct. 1, 2019

(54) MANAGING LAME DELEGATED DOMAINS WITHIN A MANAGED DNS SERVICE

(71) Applicant: VERISIGN, INC., Reston, VA (US)

(72) Inventors: Jeshmi Raman, Ashburn, VA (US); Eric Osterweil, Fairfax, VA (US); Arunabho Das, Fairfax, VA (US); Tomofumi Okubo, Herndon, VA (US); Terry Bernstein, North Potomac, MD (US)

(73) Assignee: VERISIGN, INC., Reston, VA (US)

( * ) Notice: Subject to any disclaimer, the term of this patent is extended or adjusted under 35 U.S.C. 154(b) by 105 days.

(21) Appl. No.: 15/632,246

(22) Filed: Jun. 23, 2017

(51) Int. Cl.
G06F 15/16 (2006.01)
G06F 15/173 (2006.01)
H04L 29/12 (2006.01)
H04L 29/06 (2006.01)
G06F 3/14 (2006.01)

(52) U.S. Cl.
CPC ...... *H04L 61/302* (2013.01); *H04L 29/12009* (2013.01); *H04L 61/35* (2013.01); *H04L 63/1483* (2013.01); *H04L 61/1511* (2013.01); *H04L 61/203* (2013.01); *H04L 63/1441* (2013.01)

(58) Field of Classification Search
USPC ........................................................ 709/229
See application file for complete search history.

(56) References Cited

U.S. PATENT DOCUMENTS

| 5,958,052 | A * | 9/1999 | Bellovin | H04L 29/06 709/225 |
|---|---|---|---|---|
| 7,010,578 | B1 * | 3/2006 | Lewin | G06F 17/30905 707/E17.121 |
| 7,552,338 | B1 * | 6/2009 | Swildens | G06Q 20/401 713/150 |
| 7,574,499 | B1 * | 8/2009 | Swildens | G06F 9/505 709/202 |
| 8,527,493 | B1 * | 9/2013 | Hamatake | G06Q 30/02 707/707 |
| 9,407,567 | B2 * | 8/2016 | Li | H04W 4/70 |
| 2004/0010584 | A1 * | 1/2004 | Peterson | H04L 41/046 709/224 |
| 2004/0240468 | A1 * | 12/2004 | Chin | H04L 29/12066 370/466 |
| 2005/0160335 | A1 * | 7/2005 | Peterson | H04L 41/046 714/724 |
| 2006/0112176 | A1 * | 5/2006 | Liu | H04L 29/12066 709/245 |

(Continued)

Primary Examiner — Jude Jean Gilles
(74) Attorney, Agent, or Firm — Artegis Law Group, LLP

(57) ABSTRACT

In one embodiment, a DNS service provider determines that a domain name being configured by a user is a lame delegated domain name and manages the configuration of the domain name accordingly. In operation, when a user of the DNS service provider attempts to provide configuration information for a domain name, the DNS service provider determines whether the domain name is lame delegated to the DNS service provider. If the domain name is lame delegated, then, to avoid passing control of the domain name to a nefarious entity, the DNS service provider performs a verification process to determine whether the user is the rightful owner of the domain name. The user is allowed to configure the domain name within the DNS service provider when the user is the rightful owner of the domain name.

22 Claims, 6 Drawing Sheets

(56) References Cited

U.S. PATENT DOCUMENTS

| | | | | |
|---|---|---|---|---|
| 2007/0239706 | A1* | 10/2007 | Zhang | G06F 16/382 |
| 2009/0164382 | A1* | 6/2009 | Sally | G06Q 20/24 |
| | | | | 705/67 |
| 2010/0036725 | A1* | 2/2010 | Turakhia | G06Q 30/0239 |
| | | | | 705/14.39 |
| 2010/0274836 | A1* | 10/2010 | Orentas | H04L 61/1511 |
| | | | | 709/203 |
| 2011/0106507 | A1* | 5/2011 | Lepage | G01V 11/00 |
| | | | | 703/2 |
| 2012/0041728 | A1* | 2/2012 | Gielis | G06T 17/30 |
| | | | | 703/2 |
| 2014/0101759 | A1* | 4/2014 | Antonakakis | G06F 21/577 |
| | | | | 726/22 |
| 2015/0271031 | A1* | 9/2015 | Beevers | H04L 61/1511 |
| | | | | 709/224 |
| 2016/0373252 | A1* | 12/2016 | Goldstein | H04L 9/06 |
| 2017/0041375 | A1* | 2/2017 | Panchapakesan | H04L 67/06 |
| 2017/0048186 | A1* | 2/2017 | Blinn | H04L 61/1552 |

\* cited by examiner

US 10,432,584 B1

MANAGING LAME DELEGATED DOMAINS WITHIN A MANAGED DNS SERVICE

BACKGROUND OF THE INVENTION

Field of the Invention

Embodiments of the present invention relate generally to computer networks and, more specifically, to managing lame delegated domain within a managed DNS service.

Description of the Related Art

In a domain name system (DNS), a lame delegation is a type of error that results when a name server is designated as the authoritative server for a domain name but the name server does not have authoritative data for the domain name. In the context of managed DNS service providers, a lame delegated domain name is a domain name that is delegated to the DNS service provider but not configured on that DNS service provider. Such a situation may occur if the domain owner never configured the DNS service provider or had previously configured and subsequently deleted the configuration from the DNS service provider.

Lame delegation to a DNS service provider subjects the domain name to security vulnerabilities. In particular, an entity that is not the rightful owner of the domain name may reconfigure the domain name on the same DNS service provider in order to hijack the domain name. Once configured, the entity that is not the rightful owner of the domain name controls the DNS responses for that domain name. This allows the entity to direct Internet users navigating to that domain name to any web site of their choosing, including malicious web sites.

As the foregoing illustrates, what is needed in the art are more effective techniques for managing domain names that are lame delegated to a DNS service provider.

SUMMARY OF THE INVENTION

One embodiment of the present invention sets forth a method for managing lame delegated domains. The method includes receiving, at a domain name system (DNS) service provider, a request to configure a domain name and determining that the domain name is lame delegated to the DNS service provider. The method further includes transmitting, in response to the request, an identification of a name server associated with the DNS service provider, where the identification is to be added to a trusted registry associated with the domain name to verify ownership of the domain name, and, upon determining that the identification of the name server has been added to the trusted registry, determining that the request is associated with a rightful owner of the domain name.

Advantageously, the techniques herein enable a DNS service provider to identify lame delegated domain names and prevent nefarious entities from taking control of the lame delegated domain names. In particular, an entity attempting to configure the lame delegated domain name within the DNS service provider may only do so if the entity is the rightful owner of the domain name. The DNS service provider thus blocks unauthorized third parties from configuring the lame delegated domain names.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
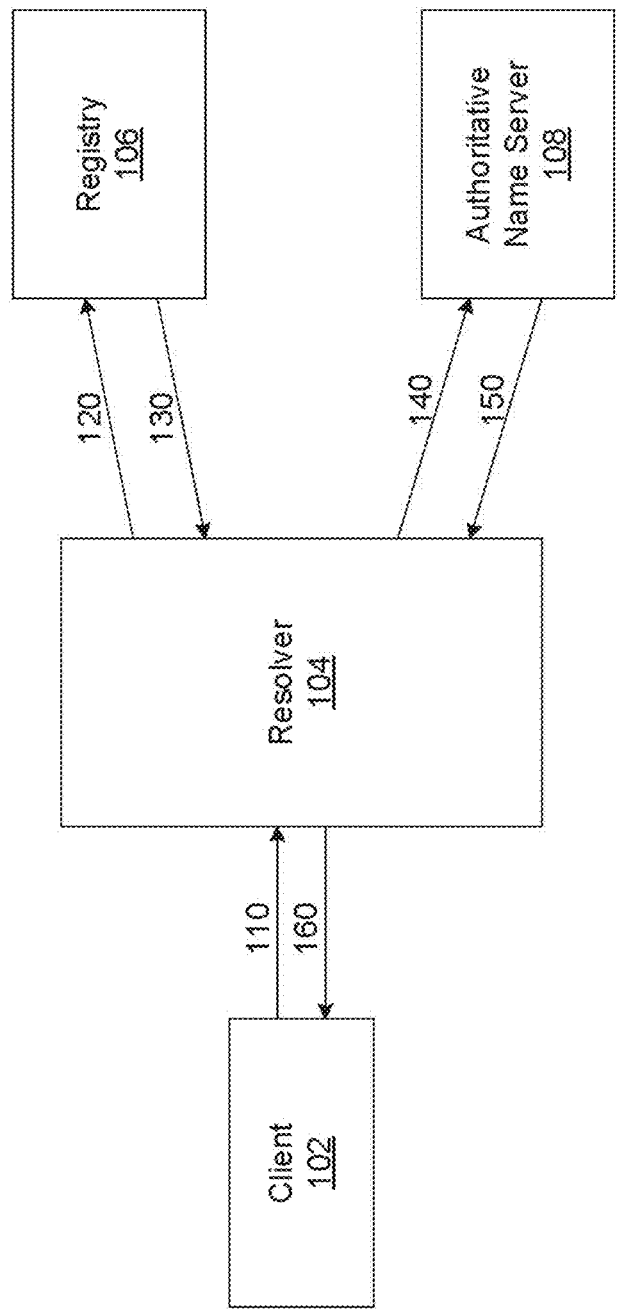
FIG. 1 is a conceptual illustration of a system configured to implement one or more aspects of the invention.

FIG. 1 is a conceptual illustration of a system 100 configured to implement one or more aspects of the invention. As shown, the system 100 includes, without limitation, a client 102, a resolver 104, registry 106, and an authoritative name server 108 operated by a domain name system (DNS) provider. In alternate embodiments, the system 100 may include any number of clients 102, resolvers 104, registries 106, and authoritative name servers 108, in any combination.

As a general matter, the system 100 includes, without limitation, entities and software that provide underlying technologies to support essential Internet functions, such as communications and security. In particular, the resolver 104, the registries 106, and the DNS service provider operating the authoritative name server 108 each provide a portion of a framework that implements the domain name system (DNS) protocol. The DNS is the part of the Internet infrastructure that translates human-readable domain names into the Internet Protocol (IP) addresses needed to establish TCP/IP (Transmission Control Protocol/Internet Protocol) communication over the Internet. The DNS is the mechanism that allows users to refer to websites and other Internet resources via intuitive domain names, such as "example.com," rather than the actual IP addresses, e.g., 192.0.2.78, that are associated with different websites and other Internet resources. As referred to herein, an "Internet resource" may be any type of device or service that is accessible via the Internet.

Each domain name is typically made up of a series of character strings or "sub-domain labels," where every two such character strings within the domain name are separated by a period. The right-to-left order of the sub-domain labels within a domain name correspond to the top-to-bottom order of domain names in a DNS hierarchy. The combination of one or more right-most sub-domain labels in a domain name is known as the public suffix. Examples of well-known public suffixes are "com"; "net"; "org"; "co.uk"; and the like. Each public suffix supports second-level sub-domain labels (also referred to herein as "parent sub-domains"), listed immediately to the left of the public suffix, e.g., the "example" labels in "example.com" or "toys" in "toys.co.uk." Domains can nest within the hierarchy for many sub-domain levels. To translate a given domain name to a corresponding IP address, the resolver 104 traverses the DNS hierarchy. The process of traversing the DNS hierarchy is referred to herein as a "DNS resolution process."

The client 102 may be any device or service that is capable of transmitting DNS queries to the resolver 104. For example, the client 102 could be a machine or a process executing on a machine, such as a conventional computing device, a tablet, a smart phone, or a wearable technology device, to name a few. To access a resource or information that is associated with a domain name, the client 102 generates a DNS query that includes the domain name and transmits the DNS query to the resolver 104. In response to the DNS query, the resolver 104 executes the DNS resolution process to generate a DNS response to the DNS query. The response includes the IP address associated with the domain name. As part of generating the DNS response, the resolver 104 may execute any number of additional operations, including generating additional DNS queries, and may store information associated with any number of the operations as a DNS log (not shown).

In the example illustrated in FIG. 1, the client 102 generates a DNS query 110 that includes the domain name "www.exampledomain.com" and transmits the DNS query 110 to the resolver 104. In response to the DNS query 110, the resolver 104 executes the DNS resolution process. As a part of the DNS resolution process, the resolver 104 identifies the public suffix of the domain name included in the DNS query 110, i.e., "com." Based on the public suffix, the resolver 104 identifies one of the registries 106 that stores address information for second level sub-domains within the "corn" public suffix. The resolver 104 generates a DNS query 120 that includes the domain name and transmits the DNS query 120 to the identified registry 106. In response to the DNS query 120, the identified registry 106 provides identification 130 of the authoritative domain name server 108 that stores configuration information specific to the domain name. In the illustrated example, the authoritative name server 108 is a name server operated by a given DNS server provider. The resolver 104 generates a DNS query 140 that includes the domain name and transmits the DNS query 140 to the authoritative name server 108. In response to the DNS query 140, authoritative name server 108 provides the IP address 150 associated with the domain name "www.exampledomain.com." The resolver 104 generates and transmits the DNS response 160 including the IP address received from the authoritative name server 108 to the client 102.

In the illustrated example, the authoritative domain name server 108 that stores configuration information specific to the domain name is operated by a DNS service provider. The DNS service provider is a managed DNS provider that allows third parties to outsource DNS hosting of Internet resources operated by the third parties to the managed DNS provider. In one embodiment, the third parties outsourcing the DNS hosting to the DNS service provider do not independently operate authoritative name servers for the domain name and rely on the functionality of the DNS service provider.

Figure 2:
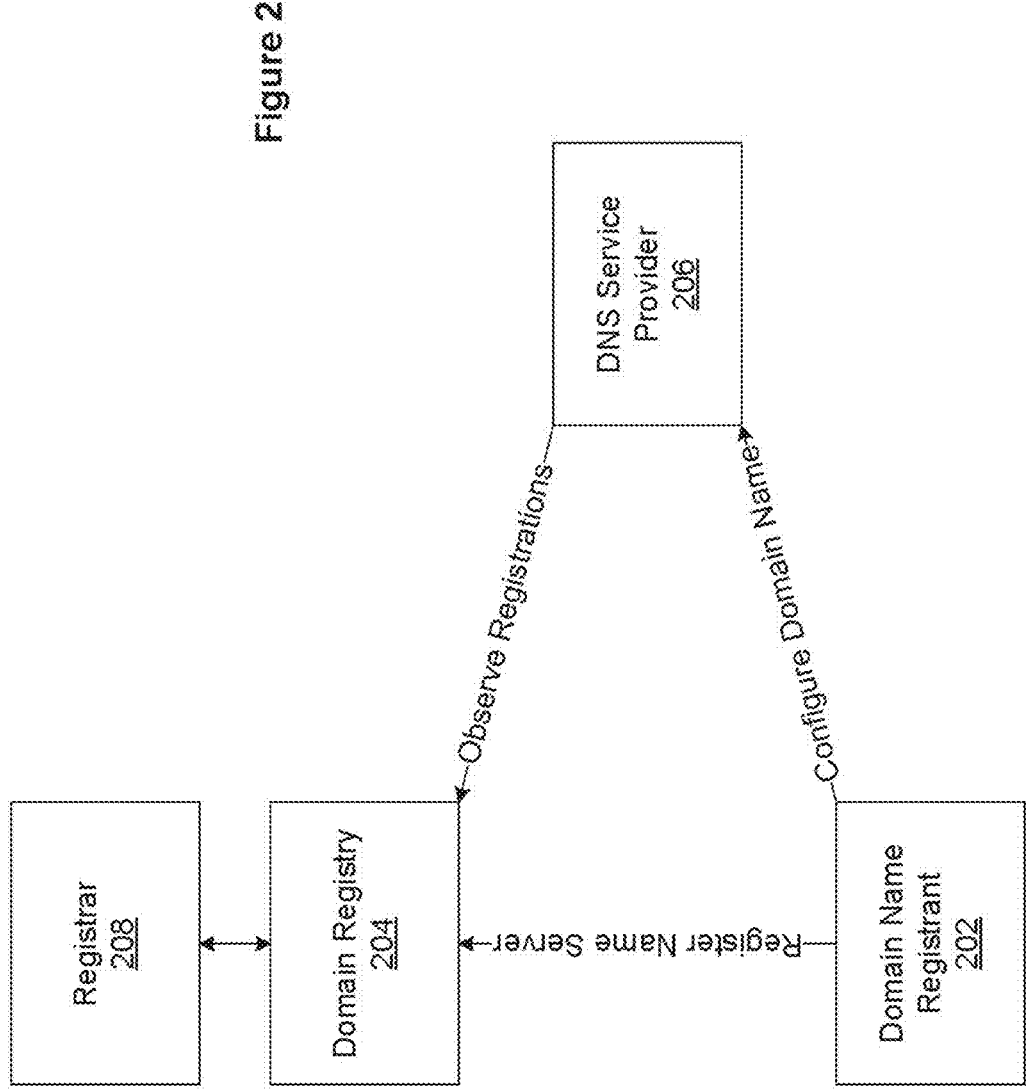
FIG. 2 illustrates relationships between a domain name registrant, a domain registry, and the DNS provider, in accordance with various embodiments.

FIG. 2 illustrates relationships between a domain name registrant 202, a domain registry 204, and a DNS service provider 206, in accordance with various embodiments. The domain name registrant 202 is the entity registering a domain name. When the entity completes registration of a domain name within the domain registry 204, the entity becomes the domain name registrant 202. The domain registry 204 is a database of domain names and the associated registrant information in the top-level domains of the DNS. In one embodiment, a third-party known as a registrar 208 operates as an intermediary between the domain name registrant 202 and the domain registry 204. The registrar 208 manages a registration request for a domain name received from the domain name registrant 202 and reserves the domain name in the domain registry 204. The domain name registrant 202 has a trust relationship with the domain registry 204 and any intermediary registrars.

The domain registry 204 provides the domain name registrant 202 with administrative control of the registered domain name. As a part of the administrative control, the domain name registrant 202 (also referred to herein as "the rightful owner of the domain name") provides to the registrar 208 with an identification (or a reference) of a name server to be used in the DNS resolution process for the registered domain name. In one embodiment, the domain name registrant 202, being the rightful owner of the domain name, is the only entity with the authority to configure the name server used in the DNS resolution process for the registered domain name. The name server identified in the domain registry 204 to respond to DNS queries related to the domain name.

In the illustrated embodiment, the domain name registrant 202, for a given domain name, provides an identification of the DNS service provider 206 to the domain registry 204. Accordingly, the domain registry 204 provides the identification of the DNS service provider 206 in response to DNS queries related to the domain name. The domain name registrant 202 also configures the domain name within the DNS service provider 206. The configuration of the domain name includes the IP address of the host server that stores the data related to the domain name. In such a manner, a request for accessing the domain name is resolved at the domain registry 204 and then at the DNS service provider 206. The name server operated by the DNS service provider 206 responds authoritatively to DNS queries related to the domain name In certain scenarios, a set of name servers, such as authoritative name server 108, operated by the DNS service provider 206 may be associated with a given domain name in the domain registry 204 but the DNS service provider 206 does not have proper configuration information for the domain name. Such a scenario is referred to herein as a lame delegation to the DNS service provider 206. A lame delegation may occur when the domain name registrant 202 of the given domain name associates the DNS service provider 206 with the given domain name in the domain registry 204 but does not provide the necessary configuration information to the DNS service provider 206. Alternatively, a lame delegation may occur when the domain name registrant 202 at one time had provided the necessary configuration information to the DNS service provider 206 but subsequently deleted the configuration information without updating the domain registry 204.

A domain name that is lame delegated to the DNS service provider 206 may open the domain name to security vulnerabilities. For example, a nefarious entity may provide configuration information for the domain name to the DNS service provider 206 such that the domain name is routed to a host server other than one intended by the rightful owner of the domain name. Identifying and addressing lame delegated domain names is therefore important to the DNS service provider 206. As described in detail below, the DNS service provider 206 utilizes the trust relationship between the domain name registrant 202 and the domain registry 204 to manage a domain name that is identified as being lame delegated to the DNS service provider 206.

Identifying and Verifying Ownership of Lame Delegated Domains

When a user of the DNS service provider 206 attempts to provide configuration information for a domain name, the DNS service provider 206 determines whether the domain name is lame delegated to the DNS service provider 206. If the domain name is lame delegated, then, to avoid passing control of the domain name to a nefarious entity, DNS service provider 206 performs a verification process to determine whether the user is the rightful owner of the domain name. The user is allowed to configure the domain name within the DNS service provider 206 when the user can provide rightful ownership of the domain name.

Figure 3:
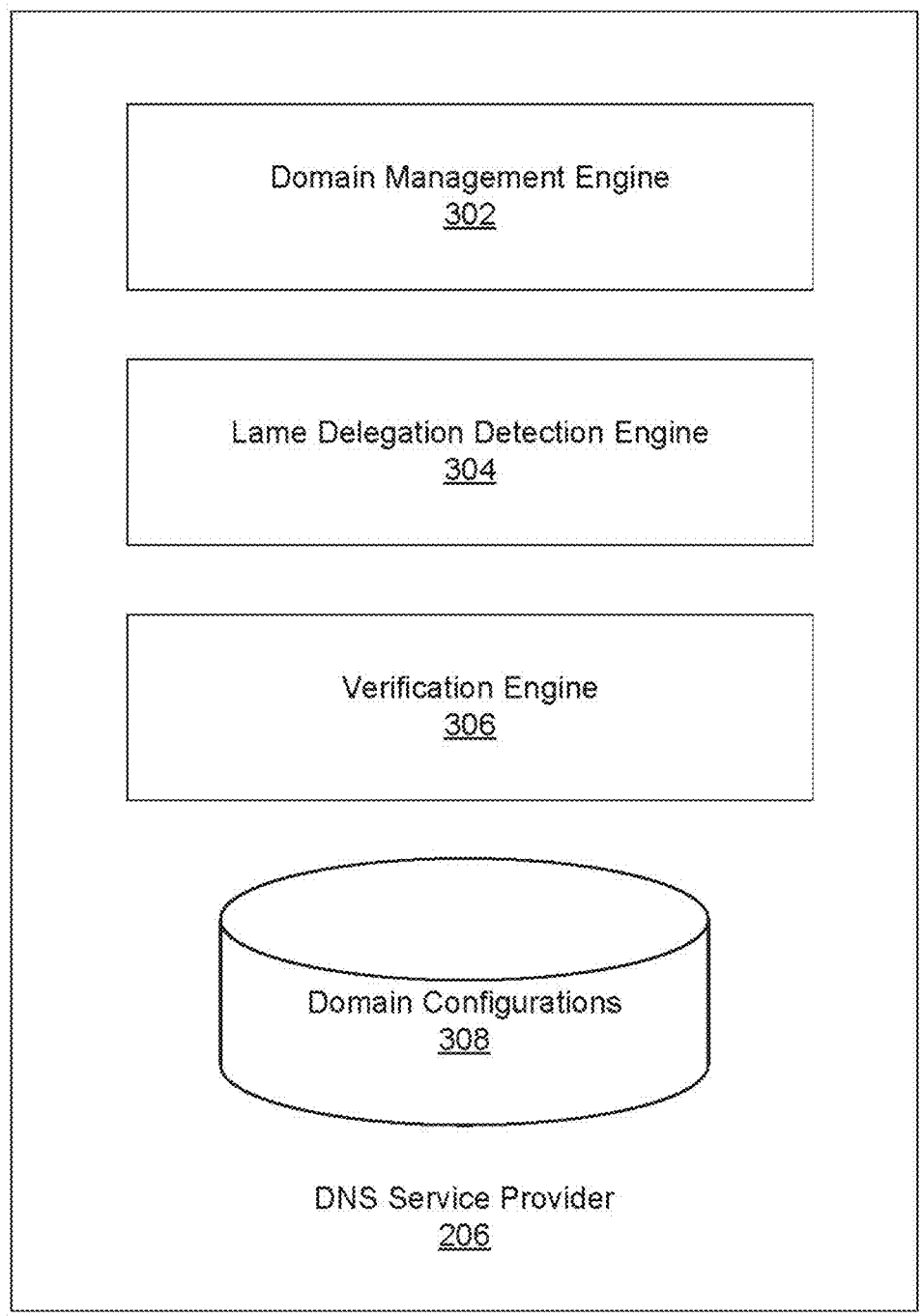
FIG. 3 is a detailed illustration of the DNS service provider of FIG. 1, in accordance with various embodiments.

FIG. 3 is a detailed illustration of the DNS service provider 206 of FIG. 1, in accordance with various embodiments. As shown, the DNS service provider 206 includes a domain management engine 302, a lame delegation detection engine 304, a verification engine 306, and domain configurations store 308.

The domain management engine 302, the lame delegation detection engine 304, the verification engine 306, and/or the domain configurations store 308 may execute on one or more processors associated with the DNS service provider 206. The one or more processors may be any instruction execution system, apparatus, or device capable of executing instructions. For example, the one or more processors could comprise a central processing unit (CPU), a digital signal processor (DSP), a controller, a microcontroller, a state machine, or any combination thereof.

The one or more processors may be coupled to memory (not shown) for storing content related to the domain management engine 302, the lame delegation detection engine 304, the verification engine 306, and/or the domain configurations store 308. The one or more processors and the memory may be implemented in any technically feasible fashion. For example, and without limitation, in various embodiments, the one or more processors and/or the memory may be implemented as a stand-alone chip or as part of a more comprehensive solution that is implemented as an application-specific integrated circuit (ASIC) or a system-on-a-chip (SoC).

The memory may be any type of non-volatile memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the memory coupled to the one or more processors. The storage may include any number and type of external memories that are accessible to the one or more processors. For example, and without limitation, the storage may include a Secure Digital Card, an external Flash memory, a portable compact disc read-only memory (CD-ROM), an optical storage device, a magnetic storage device, or any suitable combination of the foregoing.

In some embodiments, the DNS service provider 206 may interact with a cloud (e.g., encapsulated shared resources, software, data, etc.) to perform operations associated with the domain management engine 302, the lame delegation detection engine 304, and the verification engine 306. In alternate embodiments, the DNS service provider 206 may be any type of distributed computer system or cloud computing environment. In such embodiments, the one or more processors and/or the memory described above may be implemented in the cloud instead of in the DNS service provider 206.

The domain management engine 302 enables users of the DNS service provider 206 to manage configuration information associated with domain names. In one embodiment, the domain management engine 302 provides an interface (e.g., a graphical user interface (GUI), a command based tool, or an application programming interface (API)) that a user can manipulate to manage configuration information associated with a domain name. A name server operated by the DNS service provider 206 serves responses to DNS queries related to the domain name.

The domain management engine 302 stores new and updated configuration information associated with domain names in the domain configurations store 308. In one embodiment, the domain configurations store 308 is a database or a collection of databases that stores information relating to the domain names managed by the DNS service provider 206. For example, the domain configurations store 308 can be an object-oriented database, a database system, a database management system, an electronic filing system, or other computerized collection that stores items of data.

In operation, the domain management engine 302 receives a request from a user for configuring a domain name. The request may be generated as a part of a domain name creation process that configures the DNS service provider 206 to provide DNS services related to the domain name. At this time, the domain management engine 302 operates in conjunction with the lame delegation detection engine 304 (also referred to herein as the "detection engine 304") to determine whether the domain name is lame delegated to the DNS service provider 206. Such a determination is referred to herein as the "lame delegation check." The domain management engine 302 enables the user to configure the domain name only (i) if the domain name passes the lame delegation check or (ii) if the domain name fails the lame delegation check and the user is subsequently verified as the rightful owner of the domain name.

In some embodiments, the domain management engine 302 exempts certain users and/or certain domain names from the lame delegation check. For example, if a user is a domain name registrar, then the domain management engine 302 may determine that the user is exempt from the lame delegation check. In another example, if a sub-domain associated with the domain name is determined to be rightfully owned by the user, then the domain management engine 302 may determine that the domain name is exempt from the lame delegation check.

The detection engine 304 determines whether a domain name that a user is requesting to configure within the DNS service provider 206 is lame delegated to the DNS service provider 206. Generally, for the lame delegation check, the detection engine 304 determines through the DNS resolution process a set of name servers (if any) that are currently associated with the domain name. The detection engine 304 compares the determined set of the name servers with name servers that are operated by the DNS service provider 206. If any of the name servers in the determined set of name servers matches a name server operated by the DNS service provider 206, then the detection engine 304 determines that the domain name is lame delegated to the DNS service provider 206. In other words, a name server operated by the DNS service provider 206 is already associated with the domain and, thus, a user attempting to create the domain name within the DNS service provider may be acting nefariously in order to hijack that domain name.

The following provides a detailed discussion of the functions performed by the detection engine 304 upon receiving a request from the domain management engine 302 to perform a lame delegation check for a domain name. In operation, for the lame delegation check, the detection engine 304 determines the public suffix associated with the domain name. As discussed previously, each domain name is typically made up of a series of character strings or labels, where every two such character strings within the domain name are separated by a period. In some embodiments, the combination of one or more right-most labels in a domain name is known as the public suffix. Because the public suffix of a given domain name may be well-known or may be more obscure, the detection engine 304 iteratively evaluates the labels in the domain name to determine its public suffix. More specifically, the detection engine 304 parses the domain name to identify the different sub-domain labels in the domain name. The detection engine 304 then compares the right-most sub-domain label with a list of public suffixes. The list of public suffixes can be known public suffixes commonly recognized within the Internet infrastructure and/or public suffixes independently identified by the DNS service provider 206 over time.

If the right-most sub-domain label matches a public suffix on the list, then the detection engine 304 determines that the right-most sub-domain label is the public suffix of the domain name. If, however, the right-most sub-domain label does not match any public suffix on the list, then the detection engine 304 iteratively evaluates domain name from left to right to find a match. The detection engine 304 compares first combines all but the left-most sub-domain labels. The detection engine 304 compares the combined sub-domain labels against the list of public suffixes to identify a match, if any. If a match is not found, the detection engine 304 combines all but the left most sub-domain label and compares the combination against the list of public suffixes to identify a match, if any. The detection engine 304 continues this combination process until a match in the list of public suffixes is found or until all of the sub-domain labels have been combined and compared. If a public suffix cannot be determined, then the detection engine 304 raises an error to the domain management engine 302 indicating that the domain name cannot be checked for lame delegation and/or the domain name is an invalid domain name. In such a scenario, the domain management engine 302 may block the user from configuring the domain name within the DNS service provider 206.

Once the public suffix of the domain name is determined, the detection engine 304 performs a DNS resolution process to identify a set of authoritative name servers for the domain name. As discussed above, the registries 106 operate in conjunction with a domain registry 204 to maintain a list of authoritative name servers for each sub-domain associated with a public suffix, i.e., the parent sub-domain of the domain name. The detection engine 304 compares the identified set of authoritative name servers with name servers that are operated by the DNS service provider 206. As discussed above, if any of the identified authoritative name servers matches a name server operated by the DNS service provider 206, then the detection engine 304 determines that the domain name is lame delegated to the DNS service provider 206. The domain name thus fails the lame delegation check. The detection engine 304 transmits the result of the lame delegation check to the domain management engine 302.

In some embodiments, the identified set of authoritative name servers resulting from the DNS resolution process include actual names of the name servers as opposed to the IP addresses of those name servers. These actual names of the name servers may not match the names of the name servers operated by the DNS service provider 206 even though the underlying servers are the same. For example, a given name of a name server may be a vanity name or a white labeled name that is specific to the entity that owns the domain name associated with the name server. In such a situation, matching the actual names of the authoritative name servers with the names of name servers operated by the DNS service provider 206 may result in false negatives. To counter the false negatives, the detection engine 304 compares the IP addresses associated with the identified set of authoritative name servers with the IP addresses of name servers operated by the DNS service provider 206 The IP addresses associated with the identified set of authoritative name servers may be determine via a DNS resolution process. If any of the IP addresses associated with the set of authoritative name servers matches an IP address of a name server operated by the DNS server provider 206, then the detection engine 304 determines that the domain name is lame delegated to the DNS service provider 206. The domain name thus fails the lame delegation check. The detection engine 304 transmits the result of the lame delegation check to the domain management engine 302.

When a lame delegation check fails, the domain management engine 302 may prevent the user from configuring the domain name within the DNS service provider until the user is verified as a rightful owner of the domain name. In one embodiment, the domain management engine 302 notifies the user that the lame delegation check failed and that the user has to be verified as a rightful owner of the domain name before domain name can be configured. The notification may be presented in an interface, e.g., a graphical user interface (GUI) or an application programming interface (API) accessible, to the user.

The domain management engine 302 operates in conjunction with the verification engine 306 to verify that the user is a rightful owner of the lame delegated domain name. In operation, the verification engine 306 provides the user with one or more verification mechanism(s) for verifying that the user is the rightful owner of the lame delegated domain name. Three such verification mechanisms are described below. Persons skilled in the art would readily recognize that any other technically feasible verification mechanisms are within the scope here. Further, the verification engine 306 may combine any number of verification mechanisms to verify that the user is the rightful owner of the lame delegated domain name.

The first verification mechanism requires the user to modify the domain registry associated with the domain. As discussed above, only a rightful owner of a domain name has the authority to modify details related to the domain name in the domain registry associated with the domain name. Thus, requiring the user to modify the domain registry utilizes the trust relationship between the rightful owner and the domain registry to perform the verification.

To implement the first verification mechanism, the verification engine 306 selects an identification, e.g., the name, of a name server operated by the DNS service provider 206 to be added to the domain registry in association with the domain name. In one embodiment, the selected name server is different from the set of authoritative name servers identified by the detection engine 304 during the lame delegation check. In another embodiment, the selected name server has a different name from each of the set of authoritative name servers but has an IP address that matches at least one of the authoritative name servers. This prevents duplication of name servers associated with the domain name in the domain registry.

The verification engine 306 transmits the identification of the selected name server to the domain management engine 302. In response, the domain management engine 302 presents the identification of the selected name server to the user attempting to configure the lame delegated domain name and instructs the user to add the identification to the domain registry associated with the domain name. If the user successfully adds to or modifies the identification in the domain registry, then the user is the rightful owner of the domain name. If, however, the user cannot add the identification to the domain registry, then the user cannot be verified as the rightful owner of the domain name.

The second verification mechanism requires the user to authorize the configuration of the domain name within the DNS service provider 206. To implement the second verification mechanism, the verification engine 306 determines contact information associated with the rightful owner of the domain name. In one embodiment, the verification engine 306 determines the contact information using a whois tool provided by the domain registry associated with the domain. The verification engine 306 then transmits, via the contact information, a request to the rightful owner to authorize the configuration of the domain name. In one embodiment, the verification engine 306 provides an authorization tool, such as an authorization link embedded in an electronic message, to the user to authorize the configuration of the domain name.

The third verification mechanism requires the user to obtain an authorization code from a trusted party, such as the registrar, and provide the authorization code to the DNS service provider 206 for verification with the trusted party. To implement the third verification mechanism, the verification engine 306 directs the user to the trusted party for obtaining the authorization code. If the user can obtain the authorization code through a trusted exchange with the trusted party, then the user provides the authorization code to the verification engine 306. The verification engine 306 verifies the authorization code with the trusted party to verify that the user is the rightful owner of the domain name. If, however, the user cannot obtain the authorization code, then the verification engine 306 determines that the user cannot be verified as the rightful owner of the domain name.

In one embodiment, the verification mechanism is performed as a part of the configuration process initiated by the user. In alternative embodiments, once a lame delegation check fails, the domain configuration process also fails and the verification mechanism is performed independent of the domain configuration process. In any subsequent attempts by the user to configure the same domain name, the verification engine 306, upon request from the domain management engine 302, determines whether the domain name had previously failed the lame delegation check and, if so, whether the user has been verified as the rightful owner of the domain name via one or more verification mechanisms. In some embodiments, if the user has not been verified, the same verification mechanisms are provided again to the user and the domain management engine 302 continues to prevent the user from configuring the domain name such verification is completed.

In one embodiment, the domain management engine 302 enables users of a domain name configured within the DNS service provider 206 to delete the configuration within the DNS service provider 206. In such a case, the domain management engine 302 prevents the reconfiguration of the same domain name within DNS service provider 206 until the user reconfiguring the domain name provides via one or more verification mechanisms that the user is the rightful owner of the domain name. In another embodiment, once a configuration of a domain name within the DNS service provider 206 is deleted by the user, the domain management engine 302 requires that the user update the domain registry to specify a new set of authoritative name servers operated by the domain management engine 302 in association with the domain name.

Figure 4:
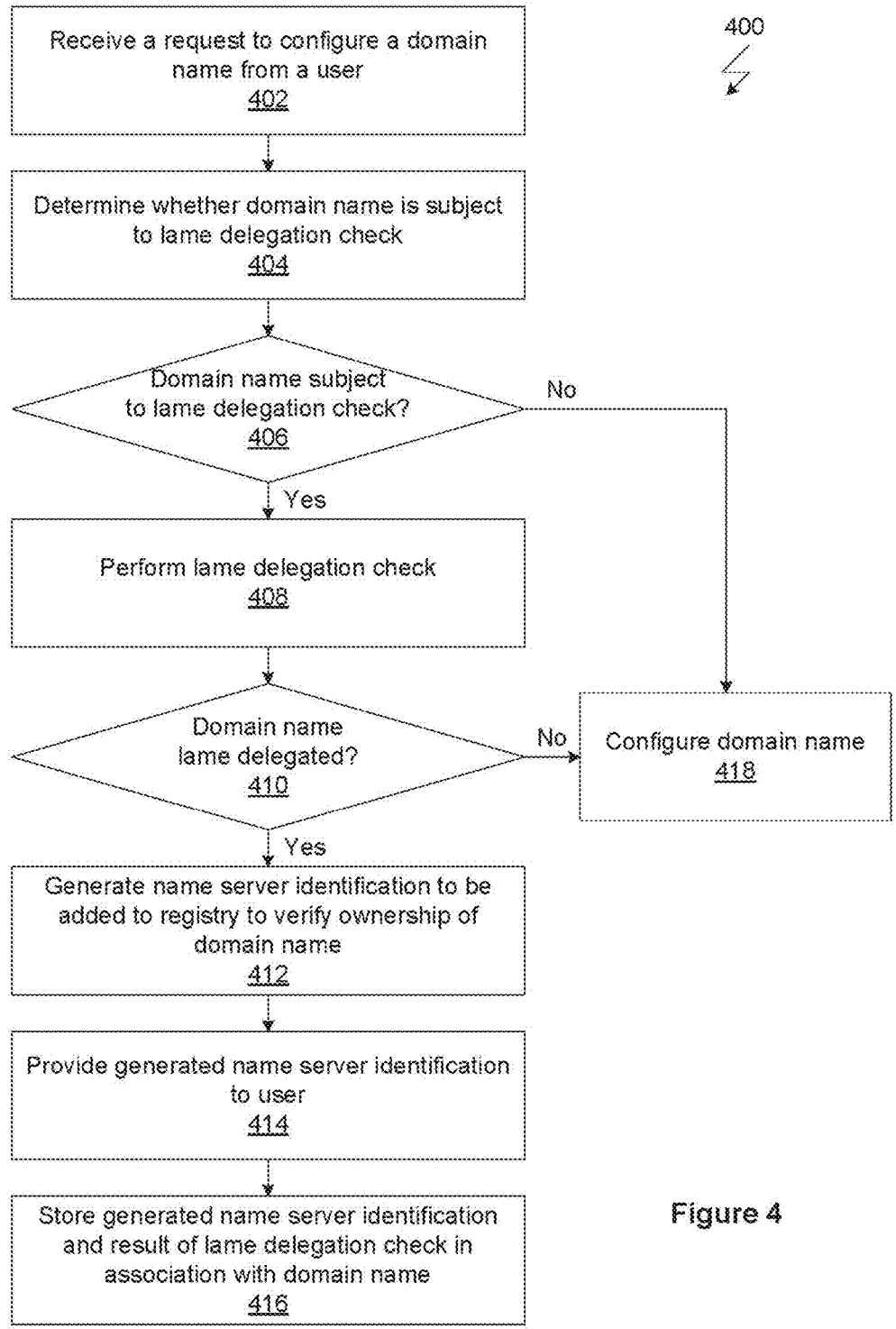
FIG. 4 is a flow diagram of method steps for managing a lame delegated domain name, in accordance with various embodiments.

FIG. 4 is a flow diagram of method steps for managing a lame delegated domain name, in accordance with various embodiments. Although the method steps are described with reference to the systems of FIGS. 1-3, persons skilled in the art will understand that any system configured to implement the method steps, in any order, falls within the scope of the present invention.

As shown, a method 400 begins at step 402, where the DNS server provider 206 receives a request to configure a domain name from a user. The user may not be the rightful owner of the domain name and, thus, may be attempting to hijack the domain name from its rightful owner if the domain name is lame delegated to the DNS server provider 206. At step 404, the DNS server provider 206 determines whether the domain name is subject to the lame delegation check. As discussed above, the domain management engine 302 exempts certain users and/or certain domain names from the lame delegation check.

At step 406, if the domain name is not subject to the lame delegation check, then the method proceeds to step 418. At step 418, the DNS server provider 206 configures the domain name as requested by the user. If, however, at step 406, the domain name is subject to the lame delegation check, then the method proceeds to step 408. At step 408, the DNS server provider 206 performs the lame delegation check on the domain name to determine whether the domain name is lame delegated to the DNS server provider 206. As discussed above, the domain name is lame delegated to the DNS server provider 206 when a set of name servers operated by the DNS server provider 206 are associated with a given domain name in the domain registry 204 but the DNS server provider 206 does not have proper configuration information for the domain name. The steps for performing the lame delegation check are described below in conjunction with FIG. 5

At step 410, if the domain name is not lame delegated to the DNS server provider 206, then the method proceeds to the previously described step 418. If, however, at step 410, the domain name is lame delegated to the DNS server provider 206, then the method proceeds to step 412.

At step 412, the DNS server provider 206 generates an identification associated with a name server operated by the DNS server provider 206. At step 414, the DNS server provider 206 provides the name server identification to the user. The name server identification is to be added via a trusted mechanism to a domain registry associated with the domain name. Adding the name server identification to the domain registry enables the DNS server provider 206 to verify that the user is the rightful owner of the domain name.

At step 416, the DNS server provider 206 stores the name server identification and the result of the lame delegation check in association with the domain name and the particular user. The DNS server provider 206 checks against this stored information upon receiving any further requests from the user to configure the domain name within the DNS server provider 206. Until the user is verified as the rightful owner of the domain name, the user continues to be prevented from configuring the domain name within the DNS server provider 206.

Figure 5:
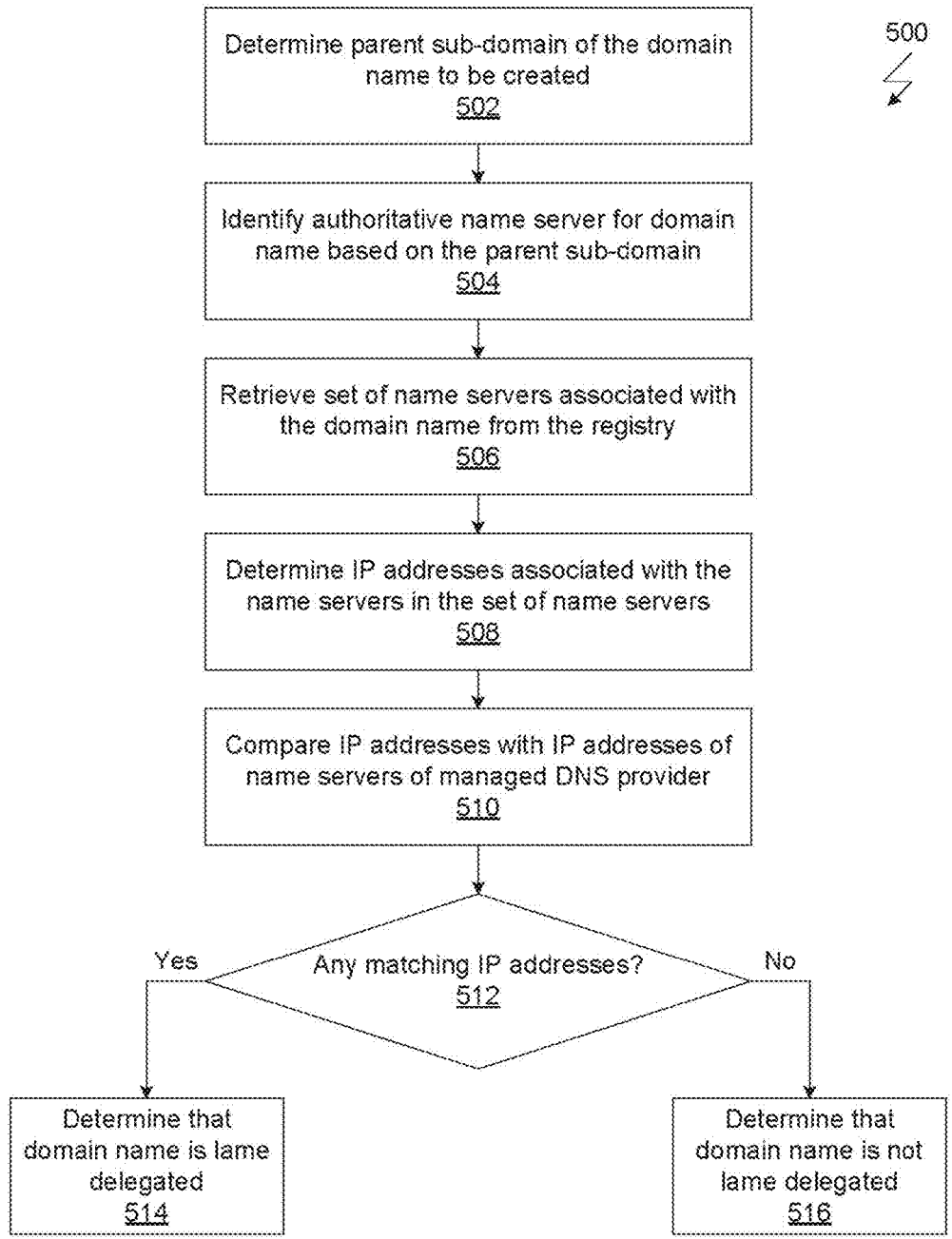
FIG. 5 is a flow diagram of method steps for identifying a lame delegated domain, in accordance with various embodiments.

FIG. 5 is a flow diagram of method steps for identifying a lame delegated domain, in accordance with various embodiments. Although the method steps are described with reference to the systems of FIGS. 1-3, persons skilled in the art will understand that any system configured to implement the method steps, in any order, falls within the scope of the present invention.

As shown, a method 500 begins at step 502, where the DNS server provider 206 determines the parent sub-domain, i.e., the sub-domain to the immediate left of the public suffix of the domain name, associated with the domain name subject to the lame delegation check. The DNS server provider 206 iteratively evaluates the sub-domain labels in the domain name to determine its parent sub-domain.

At step 504, the DNS server provider 206 identifies an authoritative name server for the domain name by performing a DNS resolution process on the parent sub-domain. As discussed above, the registries 106 operate in conjunction with a domain registry to maintain an authoritative name server for each sub-domain. At step 506, the DNS server provider 206 retrieves a set of name servers associated with the domain name from the registry 106. At step 508, the DNS server provider 206 determines the IP addresses associated with the set of name servers retrieved at step 506. In one embodiment, the DNS server provider 206 determines the IP addresses using a DNS resolution process.

At step 510, the DNS server provider 206 compares the IP addresses of the set of name servers with IP addresses of local name servers that are operated by the DNS server provider 206. At step 512, if an IP address associated with the set of name servers matches an IP address of a local name server operated by the DNS server provider 206, then the method 500 proceeds to step 514. At step 514, the DNS server provider 206 determines that the domain name is lame delegated to the DNS server provider 206. If, however, at step 512, none of the IP addresses associated with the set of name servers matches an IP address of a local name server operated by the DNS server provider 206, then the method 500 proceeds to step 516. At step 516, the DNS server provider 206 determines that the domain name is not lame delegated to the DNS server provider 206.

Figure 6:
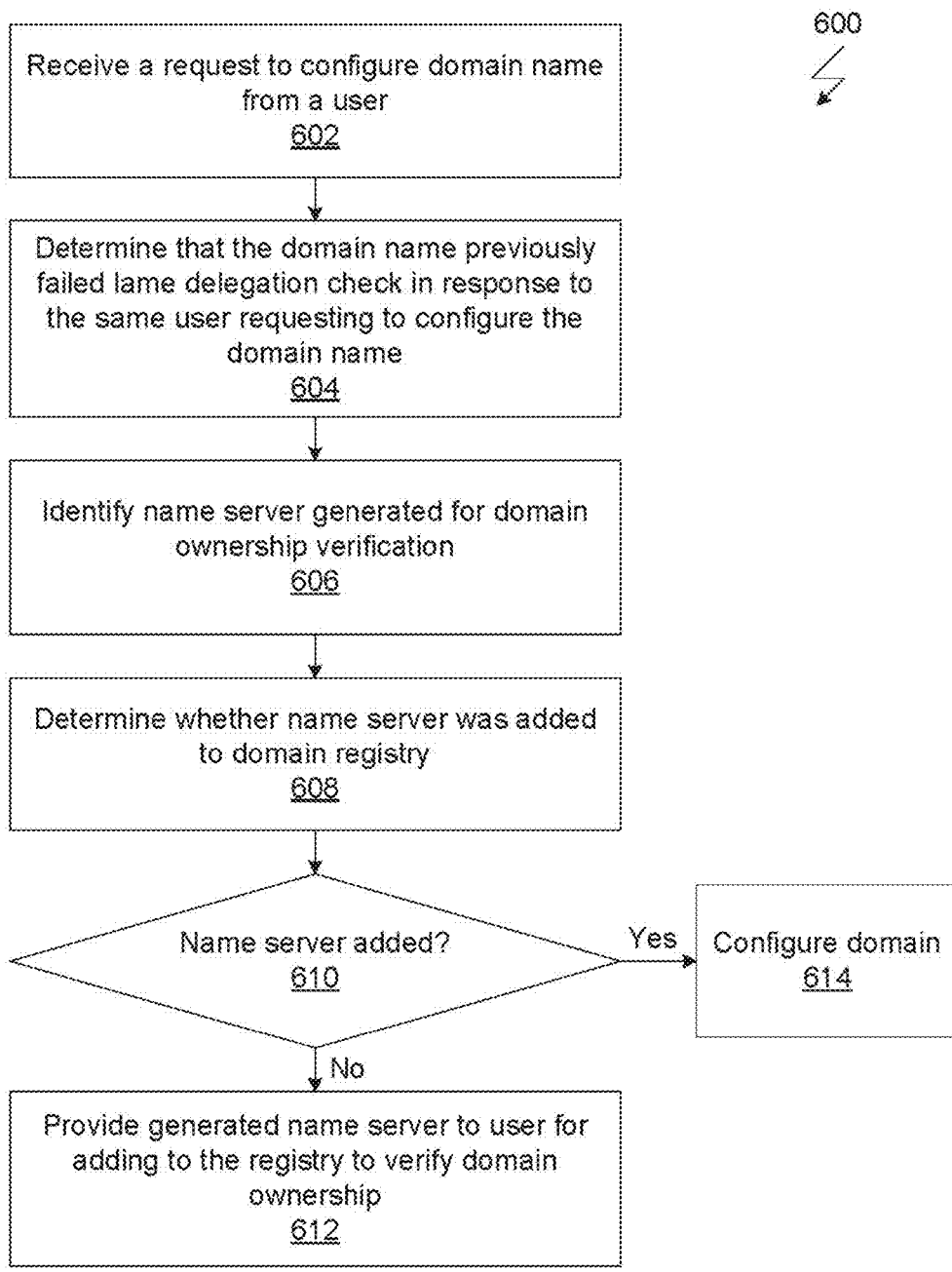
FIG. 6 is a flow diagram of method steps for verifying a rightful owner of a lame delegated domain name, in accordance with various embodiments.

FIG. 6 is a flow diagram of method steps for verifying a rightful owner of a lame delegated domain name, in accordance with various embodiments. Although the method steps are described with reference to the systems of FIGS. 1-3, persons skilled in the art will understand that any system configured to implement the method steps, in any order, falls within the scope of the present invention.

As shown, a method 600 begins at step 602, where the DNS server provider 206 receives a request to configure a domain name from a user. At step 604, the DNS server provider 206 determines that the domain name previously failed a lame delegation check in response to the same user requesting to configure the domain name within the DNS server provider 206. In one embodiment, the result of each lame delegation check performed by the DNS server provider 206 is stored within the DNS server provider 206.

At step 606, the DNS server provider 206 identifies a name server identification associated with a name server operated by the DNS server provider 206, where the name server identification was generated in response to the lame delegation check failure. The name server identification was to be added via a trusted mechanism to a domain registry associated with the domain name. Adding the name server identification to the domain registry enables the DNS server provider 206 to verify that the user is the rightful owner of the domain name.

At step 608, the DNS server provider 206 determines whether the name server identification was added to the domain registry associated with the domain name. At step 610, if the name server identification was added to the domain registry, then the method 600 proceeds to step 614. At step 614, the DNS server provider 206 configures the domain name as requested by the user. If, however, at step 610, the name server identification was not added to the domain registry, then the method 600 proceeds to step 612. At step 612, the DNS server provider 206 again provides the generated name server identification to the user for adding via a trusted mechanism to a domain registry associated with the domain name.

In sum, the disclosed techniques enable the DNS server provider 206 to determine that a domain name being configured by a user is a lame delegated domain name and manage the configuration of the domain name accordingly. In operation, when a user of the DNS server provider 206 attempts to provide configuration information for a domain name, the DNS server provider 206 determines whether the domain name is lame delegated to the DNS server provider 206. If the domain name is lame delegated, then, to avoid passing control of the domain name to a nefarious entity, the DNS server provider 206 performs a verification process to determine whether the user is the rightful owner of the domain name. The user is allowed to configure the domain name within the DNS server provider 206 when the user is the rightful owner of the domain name.

Advantageously, the techniques described herein enable a DNS service provider to identify lame delegated domain names and prevent nefarious entities from taking control of the lame delegated domain names. In particular, an entity attempting to configure the lame delegated domain name within the DNS service provider may only do so if the entity is the rightful owner of the domain name. The DNS service provider thus blocks unauthorized third parties from configuring the domain names in order to take control of those domain names.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for managing lame delegated domains, the method comprising:
   receiving, at a domain name system (DNS) service provider, a request to configure a domain name;
   determining that the domain name is lame delegated to the DNS service provider;
   transmitting, in response to the request, an identification of a name server associated with the DNS service provider, wherein the identification is to be added to a trusted registry associated with the domain name to verify ownership of the domain name; and
   upon determining that the identification of the name server has been added to the trusted registry, determining that the request is associated with a rightful owner of the domain name.

2. The method of claim 1, wherein determining that the domain name is lame delegated to the DNS service provider comprises:
   resolving the domain name to identify a set of name servers storing configuration information associated with the domain name; and
   comparing the set of name servers with a set of name servers operated by the DNS service provider, wherein the domain name is lame delegated when at least one name server in the set of name servers matches at least one name server in the set of name servers operated by the DNS service provider.

3. The method of claim 2, wherein resolving the domain name to identify a set of name servers comprises:
   resolving a parent sub-domain portion of the domain name to identify an authoritative name server associated with a parent sub-domain; and
   retrieving the set of name servers from the authoritative name server.

4. The method of claim 2, wherein comparing the set of name servers with the set of name servers operated by the DNS service provider comprises comparing a set of internet protocol addresses associated with the set of name servers with a local set of internet protocol addresses associated with a local set of name servers.

5. The method of claim 1, further comprising transmitting, in response to the request, an instruction to add the identification of the name server to the trusted registry.

6. The method of claim 1, wherein determining that the request is associated with the rightful owner of the domain name comprises:
   resolving the domain name to identify a set of name servers storing configuration information associated with the domain name; and
   determining that the identification of the name server matches at least one name server in the set of name servers operated by the DNS service provider.

7. The method of claim 1, further comprising denying the request to configure the domain name until the identification of the name server has been added to the trusted registry.

8. The method of claim 1, further comprising:
   receiving, at the DNS service provider, a second request to configure a subdomain associated with the domain name, wherein the second request is associated with the rightful owner; and
   determining that the subdomain is not subject to a lame delegation check based on a previously verified identity associated with the rightful owner.

9. The method of claim 1, further comprising:
receiving, at the DNS service provider, a second request to configure a parent domain associated with the domain name, wherein the second request is associated with the rightful owner; and
determining that the parent domain is not subject to a lame delegation check based on a previously verified identity associated with the rightful owner.

10. One or more computer-readable storage media including instructions that, when executed by one or more processors, cause the one or more processors to perform the steps of:
receiving, at a domain name system (DNS) service provider, a request to configure a domain name;
determining that the domain name is lame delegated to the DNS service provider;
transmitting, in response to the request, an identification of a name server associated with the DNS service provider, wherein the identification is to be added to a trusted registry associated with the domain name to verify ownership of the domain name; and
upon determining that the identification of the name server has been added to the trusted registry, determining that the request is associated with a rightful owner of the domain name.

11. The one or more computer-readable storage media of claim 10, wherein:
determining that the domain name is lame delegated to the DNS service provider comprises:
resolving the domain name to identify a set of name servers storing configuration information associated with the domain name; and
comparing the set of name servers with a set of name servers operated by the DNS service provider, wherein the domain name is lame delegated when at least one name server in the set of name servers matches at least one name server in the set of name servers operated by the DNS service provider.

12. The one or more computer-readable storage media of claim 11, wherein resolving the domain name to identify a set of name servers comprises:
resolving a parent sub-domain portion of the domain name to identify an authoritative name server associated with a parent sub-domain; and
retrieving the set of name servers from the authoritative name server.

13. The one or more computer-readable storage media of claim 11, wherein comparing the set of name servers with the set of name servers operated by the DNS service provider comprises comparing a set of internet protocol addresses associated with the set of name servers with a local set of internet protocol addresses associated with local set of name servers.

14. The one or more computer-readable storage media of claim 10, wherein the instructions, when executed by the one or more processors, cause the one or more processors to perform the step of transmitting, in response to the request, an instruction to add the identification of the name server to the trusted registry.

15. The one or more computer-readable storage media of claim 10, wherein determining that the request is associated with the rightful owner of the domain name comprises:
resolving the domain name to identify a set of name servers storing configuration information associated with the domain name; and
determining that the identification of the name server matches at least one name server in the set of name servers.

16. The one or more computer-readable storage media of claim 10, wherein the instructions, when executed by the one or more processors, cause the one or more processors to perform the step of denying the request to configure the domain name until the identification of the name server has been added to the trusted registry.

17. The one or more computer-readable storage media of claim 10, wherein the instructions, when executed by the one or more processors, cause the one or more processors to perform the steps of:
receiving, at the DNS service provider, a second request to configure a subdomain associated with the domain name, wherein the second request is associated with the rightful owner; and
determining that the subdomain is not subject to a lame delegation check based on a previously verified identity associated with the rightful owner.

18. The one or more computer-readable storage media of claim 10, wherein the instructions, when executed by the one or more processors, cause the one or more processors to perform the steps of:
receiving, at the DNS service provider, a second request to configure a parent domain associated with the domain name, wherein the second request is associated with the rightful owner; and
determining that the parent domain is not subject to a lame delegation check based on a previously verified identity associated with the rightful owner.

19. A DNS service provider comprising:
a memory storing instructions; and
a processor that is coupled to the memory, wherein, when executed by the processor, the instructions configure the processor to:
determine that a domain name is lame delegated to the DNS service provider,
transmitting, in response to a request to configure a domain name, an identification of a name server, wherein the identification is to be added to a trusted registry associated with the domain name to verify ownership of the domain name, and
upon determining that the identification of the name server has been added to the trusted registry, determining that the request is associated with a rightful owner of the domain name.

20. The DNS service provider of claim 19, wherein the instructions configure the processor to determine that the domain name is lame delegated to the DNS service provider by:
resolving the domain name to identify a set of name servers storing configuration information associated with the domain name; and
comparing the set of name servers with a local set of name servers operated by the DNS service provider, wherein the domain name is lame delegated when at least one name server in the set of name servers matches at least one name server in the local set of name servers.

21. A computer-implemented method for managing lame delegated domains, the method comprising:
receiving, at a domain name system (DNS) service provider, a request to configure a domain name;
determining that the domain name is lame delegated to the DNS service provider; and
after receiving the request, transmitting an identification of a name server associated with the DNS service provider, wherein the identification is to be added to a trusted registry associated with the domain name to verify ownership of the domain name.

22. A computer-implemented method for managing lame delegated domains, the method comprising:

receiving, at a domain name system (DNS) service provider, a request to configure a domain name;

determining that the domain name is lame delegated to the DNS service provider; and after determining that the domain name is lame delegated to the DNS service provider, determining that the request is associated with a rightful owner of the domain name.

* * * * *